Patented Mar. 30, 1948

2,438,705

UNITED STATES PATENT OFFICE 2,438,705

CYANINE DYESTUFF INTERMEDIATES

John David Kendall, Ilford, England, assignor to Ilford Limited, Ilford, England, a British company No Drawing. Application February 24, 1943, Serial No. 476,911. In Great Britain March 2, 1942

5 Claims. (Cl. 260—240)

This invention relates to the production of new organic compounds which are valuable intermediates in the production of dyestuffs.

According to the present invention, dyestuff intermediates of the general formula I

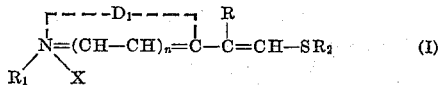

where $D_1$ is the residue of a heterocyclic nitrogen ring of the type used in cyanine dyes, R is a hydrogen atom or an alkyl, aryl or aralkyl group, $R_1$ is an alkyl or aralkyl group, $R_2$ is an alkyl, aryl or aralkyl group, X is a $p$-toluene sulphonate group and $n$ is naught or one, are produced by condensing an alkyl or aralkyl $p$-toluene sulphonate quaternary salt of a heterocyclic nitrogen compound of the type used in cyanine dyes containing a reactive methyl or mono-substituted methyl group in the $\alpha$ or $\gamma$ position to the heterocyclic quaternary nitrogen atom with an ester of trithio-orthoformic acid, the condensation being effected in the presence of a non-basic solvent for the reactants.

The dyestuff intermediates of general formula I so prepared may be converted to quaternary salts of other acids by the addition of the dyestuff intermediates to solutions of salts of such other acids, e. g., potassium chloride, bromide or iodide, and it is to be understood that the present invention includes the production of such other quaternary salts.

The process of the present invention is remarkable for the reason that it has been known for some years that if an alkyl halide quaternary salt of a heterocyclic nitrogen compound containing a reactive methyl or mono-substituted methyl group in the $\alpha$ or $\gamma$ position to the heterocyclic quaternary nitrogen atom is reacted with an ester of trithio-orthoformic acid in the presence of acetic anhydride the product obtained is a trinuclear neocyanine type of dye, whilst if the reaction is effected in the presence of pyridine a dinuclear symmetrical carbocyanine type of dye is formed (see paper by Kimura, Proc. Imp. Acad. (Tokyo), vol. 13, pages 261–265 (1937)).

By the process of the present invention, however, using a $p$-toluene sulphonate quaternary salt, susbtantially the sole product obtained is the intermediate of general formula I.

According to a further feature of this invention dyestuff intermediates of the general formula I where X is an anion other than $p$-toluene sulphonate are prepared by reacting an alkyl or aralkyl quaternary salt (other than an alkyl $p$-toluene sulphonate) of a heterocyclic nitrogen compound containing a reactive methyl or monosubstituted methyl group in the $\alpha$ or $\gamma$ position to the heterocyclic quaternary nitrogen atom with a large excess over one molecular equivalent of an ester of trithio-orthoformic acid, the condensation being effected in the presence of a non-basic solvent for the reactants.

In the process defined in the preceding paragraph a substantial quantity of a trinuclear neocyanine type of dye is also formed and the dyestuff intermediate of general formula I must be separated therefrom, e. g., by fractional crystallisation. For this reason the method defined above, using an alkyl or aralkyl-$p$-toluene sulphonate quaternary salt, is generally preferred as the products are readily separated from the reaction mixture and may readily be converted to other, less-soluble salts if such are required.

As indicated above the radicle $D_1$ in the general formula I is a residue of a heterocyclic nitrogen ring. Heterocyclic nitrogen compounds which may be employed in the process of the present invention are, for example, thiazoles, oxazoles, selenazoles and their polycyclic homologues such as those of the benzene, naphthalene, acenaphthene and anthracene series; pyridine and its polycyclic homologues such as quinoline and $\alpha$ and $\beta$ naphthaquinolines; lepidines; indolenines; diazines, such as pyrimidines and quinazolines; diazoles (e. g. thio-$\beta\beta'$-diazole), oxazolines, thiazolines and selenazoles. The polycyclic compounds of these series may also be substituted in the carbocyclic rings with one or more groups such as alkyl, aryl, amino, hydroxy, alkoxy and methylene-dioxy groups, or by halogen atoms.

The groups R, $R_1$ and $R_2$ in general formula I may be alkyl or aralkyl groups, e. g., methyl, ethyl, propyl, butyl and higher alkyl groups and benzyl and napthyl methyl groups. The groups R and $R_2$ may also be aryl groups, e. g., phenyl or naphthyl groups and may be substituted with other groups, as, for example, alkyl, aryl, amino, hydroxy and alkoxy groups and may contain substituent halogen atoms.

The nature of the group $R_2$ depends on the precise ester of the trithio-orthoformic acid which is employed. It is preferable to employ the ethyl ester of trithio-orthoformic acid since this compound is the most readily prepared, so that in the dyestuff intermediates obtained the group $R_2$ is an ethyl group. However, other esters may be employed giving other values for the group $R_2$.

The following examples illustrate the invention but are not to be regarded as limiting it in any way:

EXAMPLE I

*Preparation of 1-ω-ethylthio-vinyl-benzthiazole-methyl-p-toluene sulphonate*

14.9 gms. of 1-methyl-benzthiazole and 18.6 gms. of methyl-p-toluene sulphonate (one molecular equivalent of each) were fused together for one hour. The fused reaction mass was cooled and 22 ccs. of ethyl tri-thio-orthoformate (10% excess over one molecular equivalent) and 100 ccs. of acetic anhydride were added. The whole mixture was boiled for half an hour by which time the colour of the solution which was at first bright blue had faded through purple and red to a dull yellow colour. The acetic anhydride was then distilled off at reduced pressure and a mixture of ethyl alcohol and ether was added to the residue. The product remained undissolved as a light straw-coloured solid and was separated by filtration. It had a melting point of 170° C. with decomposition.

EXAMPLE II

*Preparation of 1-ω-ethylthio-vinyl-benzthiazole-methiodide*

(a) The process was carried out exactly as in Example I to the stage where the dull yellow coloured reaction solution was obtained. This solution was poured into potassium iodide solution and cooled. The product crystallised out and was separated by filtration. It consisted of yellowish-brown crystals with a steel-blue reflex melting at 193° C. with decomposition. This preparation repeated using 100 ccs. of propionic anhydride instead of the acetic anhydride yielded exactly the same product.

(b) 2.91 gms. of 1-methyl-benzthiazole methiodide (approximately one molecular equivalent), 4 ccs. of ethyl trithio-orthoformate (approximately two molecular equivalents) and 15 ccs. of acetic anhydride were boiled together for about fifteen minutes. A brown solid separated from the solution and was removed by filtration. This solid consisted of a mixture of the neo-cyanine dye and the desired methiodide intermediate. The solid was then extracted with methyl alcohol, in which the neocyanine dye is very insoluble, and the desired dyestuff intermediate was separated from the methyl alcohol extract.

EXAMPLE III

*Preparation of 2-ω-ethylthio-vinyl-quinoline methiodide*

This dyestuff intermediate was prepared by a process similar to that of Example II (a) using 14.2 gms. of quinaldine instead of the 1-methyl-benzthiazole. It consisted of light fawn crystals melting at 176° C. with decomposition.

EXAMPLE IV

*Preparation of 1-ω-ethylthio-vinyl-benzoxazole methiodide*

This dyestuff intermediate was prepared by a process similar to that of Example II (a) using 13.2 gms. of 1-methyl benzoxazole instead of the 1-methyl benzthiazole. A further crop of crystals of the product was obtained after the first crystallisation by adding sodium carbonate to the mother liquor. The product consisted of small brown crystals melting at 170° C. with decomposition.

EXAMPLE V

*Preparation of 4-ω-ethylthio-vinyl quinoline methiodide*

This dyestuff intermediate was prepared as in Example II (a) using 14.3 gms. of lepidine instead of the 1-methyl benzthiazole. A further crop of crystals of the product was obtained after the first crystallisation by adding sodium carbonate to the mother liquor. The product consisted of yellow crystals melting at 85° C. with decomposition.

EXAMPLE VI

*Preparation of 1-ω-ethylthio-vinyl benzthiazole ethiodide*

7.5 gms. of 1-methyl benzthiazole and 10.0 gms. of ethyl-p-toluene sulphonate were fused together for three hours at 140–150° C. The fused reaction mixture was cooled and 11 ccs. of ethyl trithio-orthoformate and 50 ccs. of acetate anhydride were added. The whole mixture was then boiled until the solution had paled to a dull yellow colour. The acetic anhydride was then removed by distillation under reduced pressure and the residue was dissolved in ethyl alcohol and then poured into potassium iodide solution. The desired product crystallised out and was separated by filtration. It consisted of small brown crystals melting at 195° C. with decomposition.

EXAMPLE VII

*Preparation of 1-ω-ethylthio-vinyl-2.2'-dimethyl indolenine methiodide*

1.73 gms. of 1-methylene-2.2'-dimethyl-N-methyl-dihydroindole, 1.9 gms. of p-toluene sulphonic acid monohydrate and 15 ccs. of acetate anhydride were heated together for 10 minutes on a water bath. To the resulting reaction mixture was added 2.2 ccs. of ethyl trithio-orthoformate and the mixture was boiled for half an hour. The acetic anhydride was then removed by distillation at reduced pressure. The residue was dissolved in ethyl alcohol and then poured into potassium iodide solution. On dilution, the desired dye intermediate was deposited as a dark mauve solid. It was separated by filtration and washed with ethyl alcohol and ether.

EXAMPLE VIII

*Preparation of 1-ω-ethylthio-vinyl-thiazoline methyl-p-toluene sulphonate*

1.0 gm. of 1-methyl thiazoline and 1.86 gms. of methyl-p-toluene sulphonate were fused together for 1 hour on a water bath. 2.2 ccs. of ethyl trithio-orthoformate and 10 ccs. of acetic anhydride were added, and after refluxing for twenty minutes the acetic anhydride was distilled off under reduced pressure. The residue, which was the desired dyestuff intermediate, was washed three times with anhydrous ether.

EXAMPLE IX

*Preparation of 1-ω-ethylthio-isopropenyl-benzthiazole methiodide*

1.63 gms. of 1-ethyl benzthiazole and 1.86 gms. of methyl-p-toluene sulphonate were fused together for three hours at 140–150° C. 2.2 ccs. of ethyl trithio-orthoformate and 10 ccs. of acetic anhydride were added to the cooled mass and the mixture boiled for 1 hour during which time a yellow colour developed. The acetic anhydride was then removed by distillation at reduced pressure and the residue dissolved in 15 ccs. ethyl alcohol and poured into aqueous potassium iodide. On cooling and diluting the solution deposited the product which was removed by filtration and washed with water, ethyl alcohol and ether. It was a light brown solid M. P. 164° C. with decomposition.

EXAMPLE X

*Preparation of 1-ω-benzylthio-vinyl-benzthiazole methiodide*

1.49 gms. of 1-methyl benzthiazole and 1.86 gms. of methyl-p-toluene sulphonate were fused together for 1 hour on the water bath. 4.2 gms. of benzyl trithio orthoformate and 15 ccs. of acetic anhydride were added to the cooled mass and the mixture boiled for 30 minutes, when the colour had faded from blue to a yellow-red. The excess acetic anhydride was removed by distillation at reduced pressure and the residue, after washing three times with anhydrous ether, was dissolved in 20 ccs. ethyl alcohol and poured into aqueous potassium iodide solution. The product was deposited partly as a brown oily solid and partly as a light yellow crystalline material. It was removed by filtration and washed with water, ethyl alcohol and ether and then recrystallised from ethyl acohol, in which solvent it was not very soluble. The recrystallised product was a dark brown solid M. P. 158° C. with decomposition.

Although in all the above examples the non-basic solvent employed was acetic anhydride, other non-basic solvents may be employed. It is important for the best results, however, that the solvent should be a good solvent for the reactants, should have a fairly high boiling point and should not have any hydrolytic action on the reactants. Acetic anhydride and propionic anhydride are particularly useful in meeting all these requirements.

The dyestuff intermediates of general formula I produced according to the present invention are valuable intermediates in the preparation of all types of symmetrical and unsymmetrical carbocyanine dyes as described in co-pending applications Nos. 476,912 and 476,913, filed on even date herewith. In most cases the alkyl or aralkyl-p-toluene sulphonate quaternary salt intermediates are the most reactive and there is frequently no need to isolate the intermediates from the reaction mixtures which are obtained in the preparation of the intermediates by the process of the present invention.

What I claim is:

1. Process for the production of dyestuff intermediates which comprises condensing a salt taken from the group consisting of alkyl and aralkyl p-toluene sulphonate quaternary salts of a heterocyclic nitrogen compound of the type used in cyanine dyes containing a reactive methylene group in the alpha or gamma position to the heterocyclic quaternary nitrogen atom with an ester of trithio-orthoformic acid, the condensation being effected in the presence of a non-basic, non-hydrolytic solvent for the reactants but in the absence of a basic condensing agent.

2. Process for the production of dyestuff intermediates which comprises condensing a salt taken from the group consisting of alkyl and aralkyl p-toluene sulphonate quaternary salts of a heterocyclic nitrogen compound of the type used in cyanine dyes containing a reactive methylene group in the $\alpha$ or $\gamma$ position to the heterocyclic quaternary nitrogen atom with an ester of trithio-orthoformic acid in the presence of a fatty acid anhydride as a solvent for the reactants but in the absence of a basic condensing agent.

3. Process for the production of dyestuff intermediates which comprises condensing a salt taken from the group consisting of alkyl and aralkyl p-toluene sulphonate quaternary salts of a heterocyclic nitrogen compound of the type used in cyanine dyes containing a reactive methylene group in the $\alpha$ or $\gamma$ position to the heterocyclic quaternary nitrogen atom with ethyl trithio-orthoformate in the presence of a fatty acid anhydride as a solvent for the reactants but in the absence of a basic condensing agent.

4. Process for the production of dyestuff intermediates which comprises condensing a salt taken from the group consisting of alkyl and aralkyl p-toluene sulphonate quaternary salts of a heterocyclic nitrogen compound of the type used in cyanine dyes containing a reactive methylene group in the $\alpha$ or $\gamma$ position to the heterocyclic quaternary nitrogen atom with ethyl trithio-orthoformate in the presence of an anhydride selected from the group consisting of acetic and propionic acid anhydrides as a solvent for the reactants but in the absence of a basic condensing agent.

5. Process according to claim 4 wherein the p-toluene sulphonate salt obtained is converted to a salt of another acid by adding it to a solution of a salt of such acid.

JOHN DAVID KENDALL.

REFERENCES CITED

The following references are of record in the file of this patent:

UNITED STATES PATENTS

| Number | Name | Date |
|--------|------|------|
| 1,524,791 | Konig | Feb. 3, 1925 |
| 1,846,304 | Brooker | Feb. 23, 1932 |
| 2,080,049 | Kendall | May 11, 1937 |
| 2,349,179 | Kumetat | May 16, 1944 |
| 2,354,524 | Kumetat | July 24, 1944 |

OTHER REFERENCES

Imperial Academy of Japan (1937–8), pages 261–265.

Konig, Berichte 55 (1922), pages 3293–3313.

Certificate of Correction

Patent No. 2,438,705.   March 30, 1948.

JOHN DAVID KENDALL

It is hereby certified that error appears in the printed specification of the above numbered patent requiring correction as follows: Column 2, line 2, before "*p*-toluene" insert the words and hyphen *or aralkyl-*; and that the said Letters Patent should be read with this correction therein that the same may conform to the record of the case in the Patent Office.

Signed and sealed this 25th day of May, A. D. 1948.

[SEAL]

THOMAS F. MURPHY,
*Assistant Commissioner of Patents.*